(12) United States Patent
Ricke et al.

(10) Patent No.: US 11,138,886 B1
(45) Date of Patent: Oct. 5, 2021

(54) SYSTEM AND METHOD FOR PROVIDING AN ILLUMINATED ROUTE FOR AN OBJECT MOVING ON A PATH

(71) Applicant: Ford Global Technologies, LLC, Dearborn, MI (US)

(72) Inventors: Tobias Ricke, Cologne (DE); Sebastian Stauff, Cologne (DE); Bruno Alves, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/168,242

(22) Filed: Feb. 5, 2021

(30) Foreign Application Priority Data

Mar. 11, 2020 (DE) .......................... 102020203102.9

(51) Int. Cl.
| | |
|---|---|
| *G08G 1/005* | (2006.01) |
| *H04W 4/40* | (2018.01) |
| *G08G 1/127* | (2006.01) |
| *G08G 1/16* | (2006.01) |
| *G08B 5/00* | (2006.01) |

(52) U.S. Cl.
CPC ............. *G08G 1/164* (2013.01); *G08B 5/006* (2013.01); *G08G 1/005* (2013.01); *G08G 1/127* (2013.01); *G08G 1/166* (2013.01); *H04W 4/40* (2018.02)

(58) Field of Classification Search
None
See application file for complete search history.

(56) References Cited

U.S. PATENT DOCUMENTS

| | | | | | |
|---|---|---|---|---|---|
| 10,467,894 | B2* | 11/2019 | Neumayer | ........... | G01C 21/206 |
| 10,493,902 | B2* | 12/2019 | Hennes | ................ | F21S 41/657 |
| 10,573,179 | B2* | 2/2020 | Tu | .......... | G08G 1/142 |
| 10,650,679 | B2* | 5/2020 | Xie | ......... | G08G 1/142 |
| 10,909,849 | B2* | 2/2021 | Kim | ..................... | G08G 1/0116 |
| 2019/0287400 | A1* | 9/2019 | Cao | ..................... | G08G 1/0175 |
| 2020/0074859 | A1* | 3/2020 | Eshima | ............... | B60W 60/001 |

FOREIGN PATENT DOCUMENTS

| | | |
|---|---|---|
| DE | 10034379 A1 | 1/2002 |
| DE | 102007007031 A1 | 8/2007 |
| DE | 102009055846 A1 | 6/2011 |
| DE | 102013002876 A1 | 8/2014 |
| DE | 202014104825 U1 | 1/2016 |

* cited by examiner

*Primary Examiner* — John F Mortell
(74) *Attorney, Agent, or Firm* — Brandon Hicks; Eversheds Sutherland (US) LLP

(57) ABSTRACT

A system for providing an illuminated path for an object, such as a pedestrian or bicyclist. The system includes a central system unit, a number of vehicles networked with the central system unit and parked in a region. Each of the vehicles includes a detection unit designed to detect an object approaching the parked vehicle and to activate a vehicle light and illuminate a path. Each of the vehicles include a communication unit designed to transmit geo-position data of the parked vehicle. The central system unit is designed, as a result of a route query, to ascertain a route for the object from a starting location to a destination location under the criterion that a maximum number of parked vehicles networked with the central system unit are present along the route so that the best possible path illumination is ensured on the route.

20 Claims, 4 Drawing Sheets

SYSTEM AND METHOD FOR PROVIDING AN ILLUMINATED ROUTE FOR AN OBJECT MOVING ON A PATH

CROSS-REFERENCE TO RELATED APPLICATIONS

The present application claims priority to and the benefit of German Application No. 102020203102.9, filed Mar. 11, 2020, which is hereby incorporated by reference herein in its entirety.

FIELD

The present disclosure relates to a system and a method for providing an illuminated path for an object, in particular a pedestrian or bicyclist, moving on the path along a route. The illumination of the path is carried out directly by vehicles which are parked along the route in the vicinity of the path. Therefore, the regions of a path can also be illuminated which lack sufficient illumination by street lighting.

The system or method proposed by the disclosure is based on the principle of intelligent vehicle networking. The goal of such networking is vehicles being able to mutually warn each other about hazards or traffic situations (for example congestion). Furthermore, an improved traffic flow or an optimized utilization of parking areas can thus be achieved.

BACKGROUND

One principle used in the context of vehicle networking is Car2X communication. This is intended to adapt and improve the safety in road traffic and the cost-effectiveness of road-traffic-bound processes to increasing mobility requirements of final customers and an increased vehicle density. One goal in this case can be to notify other road users of disruptions in the road traffic, e.g., black ice, traffic accidents, a high traffic density (congestion, slow-moving traffic), and other disruptions.

Car2X communication enables a networked vehicle to communicate with its surroundings. In this case, it exchanges items of information and data not only with other (networked) vehicles, but also with other types of traffic infrastructure, such as traffic signal systems (car to infrastructure/vehicle to infrastructure), and possibly with pedestrians (vehicle to pedestrian) or bicyclists. In this way, the vehicle obtains comprehensive items of information from its immediate and/or remote surroundings.

Presently, different technical standards and communication technologies are used worldwide for networking vehicles. Divergences result therefrom in the physical transmission properties and in the data structure. To counteract this, various transmission technologies have been studied and standardized for Car2X communication. For example, WLAN networks (IEEE 802.11p) meet the requirements for the delay-free, direct communication with other vehicles.

In particular in the development of autonomous vehicles, the development trend is focused more and more toward increasing the vehicle functionality. One such field is the optimization of a vehicle-pedestrian communication. This is frequently concerned with the problem of collisions between vehicle and pedestrians and is intended to prevent accidents.

On the other hand, wireless technologies have the potential of enabling vehicles to communicate with one another and with infrastructure surrounding the vehicles. The networking thus provides new possibilities for making a diversified mobility more efficient, safer, and more comfortable.

With respect to efficient hazard recognition, in particular collision avoidance between vehicles and other (weaker) road users (in particular pedestrians or bicyclists), an avoidance of incorrect warnings or unrecognized hazardous situations is of highest relevance. In this case, reliable recognition, classification, position determination, and assessment of the weaker road user is indispensable. The presently known approaches in the field of image processing, radar, LIDAR, and sensors already currently enable a comprehensive detection of the vehicle surroundings (and thus enable the detection of pedestrians or bicyclists), but also have weak points in object recognition in the event of poor contrast, light, and visibility conditions. The proportion of electronics in modern, networked vehicles has increased more and more in recent years. Moreover, a modern vehicle offers a variety of wireless communication interfaces in the internal vehicle electrical system. The present disclosure makes use of these developments.

Certain life situations require that pedestrians, bicyclists, or other (weak) road users have to take routes through paths or roads inadequately illuminated by the street lighting. There is therefore a need for illuminating such paths or routes.

SUMMARY

The present disclosure is therefore based on the object of specifying a system and a method for providing an illuminated path for an object, in particular a pedestrian or bicyclist, moving on the path along a route, which is independent of a path lighting or street lighting provided on the path.

It is to be noted that the features listed individually in the claims can be combined with one another in any technically reasonable way (also beyond category boundaries, for example between method and device) and disclose further embodiments of the disclosure. The description additionally characterizes and specifies the disclosure in particular in conjunction with the figures.

It is furthermore to be noted that a conjunction "and/or" used herein which stands between two features and links them to one another is always to be interpreted to mean that in a first embodiment of the subject matter according to the disclosure, only the first feature can be provided, in a second embodiment only the second feature can be provided, and in a third embodiment, both the first and also the second feature can be provided.

The system according to the disclosure is oriented toward providing an illuminated path for an object moving on the path along a route, in particular a pedestrian or bicyclist. The system comprises:
a. a central system unit, in particular a processing unit;
b. a number of vehicles mobile-networked with the central system unit and parked in a region, wherein each one of the vehicles includes
  i. a detection unit, which is designed to detect an object approaching the parked vehicle on the path and as a result of the detection to activate a vehicle light, in particular a vehicle light facing toward a path, and to illuminate the path,
  ii. a communication unit, which is designed to transmit geo-position data of the parked vehicle to the central system unit.

The system is distinguished in that the central system unit is designed, as a result of a route query, to ascertain a route for the object from a starting location located in the region up to a destination location located in the region under the criterion that a maximum number of parked vehicles networked with the central system unit is present along the route, so that the best possible path illumination is ensured on the route.

It is thus made possible that the object (for example a pedestrian or bicyclist) can move safely from a starting location up to a destination location even in poor visibility conditions, in particular darkness, even if sufficient street lighting is not present along the route. A route can thus be ascertained independently of possible street lighting.

As already mentioned, an "object" in the meaning of the terminology used in the present case is a pedestrian, a bicyclist, or another type of road user. In particular, the "object" is a road user without legally required lighting device, thus in particular pedestrians.

A "path" is to be understood in the meaning of the terminology used in the present case in particular as a path extending in the vicinity of parking areas for vehicles, for example a sidewalk (pedestrian path), a bicycle path, or another type of special path. However, the path can also be a road, a track, or the like.

The central system unit can in particular be a processing unit, which has at least one communication interface, and is thus networked with the communication units of the vehicles, in particular wirelessly. The networking between vehicles and the central system unit can be based on suitable application software. The central system unit or the application software can be based on an algorithm and can possibly incorporate artificial intelligence. The algorithm can be a route ascertainment or route optimization algorithm. The central system unit can also be constructed to be networked, which means that it does not have to be a singular processing unit, but rather a plurality of different functional units networked with one another. Such a functional unit can readily also be a database.

A "region" can be understood in the meaning of the present disclosure as a spatial region, in particular an urban or rural region. Independently of whether it is an urban, rural, or other type of region, parking areas for parked vehicles are present in the region. In principle, it is conceivable that the region is also a company site including parking areas for vehicles and the route to be ascertained is located on the company site.

A "vehicle" can be understood in terms of the present disclosure in particular as a road vehicle such as a passenger vehicle, a van, a bus, a truck, a utility vehicle, or the like.

As already mentioned, the underlying premise of the system proposed by the disclosure is to ascertain the route under the criterion that a maximum number of parked vehicles networked with the central system unit are present along the route, so that the best possible path illumination is ensured on the route. If the object, for example a pedestrian, moves along the ascertained route, the object (the pedestrian) is thus detected upon approach to a parked vehicle by means of a detection unit. As a result of the detection, a vehicle light, in particular a vehicle light facing toward the path (on which the object moves), is activated and the path is illuminated in the vicinity of the vehicle.

In principle, it is to be emphasized at this point that the vehicle light is designed in such a way that as much as possible only the path located in the immediate vicinity of the parked vehicle is illuminated, without irradiating surrounding buildings, etc. at the same time and negatively affecting or dazzling persons located therein. For this purpose, the vehicle light can be movable, i.e., alignable. In particular, the vehicle light is the front headlights of a vehicle.

The advantageous embodiments specified in the dependent claims and further advantageous (or possible) embodiments of the system proposed by the disclosure are described in detail hereinafter.

According to a first embodiment of a system according to the disclosure, it can be provided that each of the vehicles includes a GPS unit for determining geo-position data of the vehicle, wherein each vehicle in a parked state transmits geo-position data on the parking position to the central system unit. The transmission of the geo-position data can take place automatically upon reaching the parking position, for example upon reaching the vehicle standstill or shutdown of the engine. Such an event can trigger an automatic relay of the geo-position data to the central system unit. Similarly, the geo-position data of the vehicles can also be delivered continuously to the central system unit (i.e., not only in the parked state) and a parked state can be recognized automatically by the central system unit. Furthermore, the geo-position data of the vehicles can also be transmitted as a result of a position query by the central system unit to the vehicles. By knowing the geo-position data of the vehicles and the items of information linked thereto about the number and the respective geo-position of the vehicles parked in the region, the central system unit can access the parked vehicles when ascertaining the route and the respective vehicle lights can be used to illuminate the route when the route is taken by the object. Alternatively to a GPS unit, the vehicles can also have any other type of unit for position determination.

According to a further embodiment of a system according to the disclosure, it can be provided that the detection unit of each vehicle is designed to recognize the approaching object in the course of a wireless communication with a communication module of the object. If a predetermined distance of the object in relation to the vehicle is exceeded, an interaction can be triggered between the detection unit and the communication module, wherein the interaction can be a signal or data exchange, or also an electromagnetic interaction. The recognition can include an identification or authentication of the object, during which it is checked in the course of a data comparison whether the object is authorized to use the vehicle light of the vehicle for path illumination. For this purpose, the communication unit of the vehicle can compare data of the object or the object-side communication module with the central system unit. In case of a negative authentication or identification, activation of the vehicle light is denied. The mentioned wireless communication can be any suitable communication technology or recognition technology which permits a recognition of a moving object in the vicinity of a vehicle. For example, the wireless communication can be a technology based on radio.

According to a further embodiment of a system according to the disclosure, it can be provided that the communication module is integrated into a mobile terminal. A mobile terminal can be understood, for example, as a mobile telephone (cell phone, smart phone), smartwatch, or smart glasses, which is Internet capable in the manner of a mobile data communication. The mobile terminal can be networked with the central system unit, for example, using application software (an app). The communication module can also be integrated into the clothing of a person (pedestrian, bicyclist=object) or can be attached thereto, in particular as an electronic functional element or wearable.

According to a further embodiment of a system according to the disclosure, it can be provided that the object continuously transmits its geo-position data to the vehicles parked along the route, for example using a mobile terminal, in particular by transmitting the geo-position data to the central system unit and relaying the geo-position data from the central system unit to the vehicles parked along the route. In such an embodiment, either the wireless communication between the detection unit of the vehicle and the communication module of the object can be omitted, or this is thus supplemented. Via the geo-position data of the object, the vehicle immediately receives items of information as to whether the object is located in its vicinity and an activation of the vehicle light is indicated.

According to a further embodiment of a system according to the disclosure, it can be provided that the detection unit comprises a camera, which is designed to recognize the approaching object optically or thermally. In the case of the design of the detection unit as a camera, the moving object can be detected even without the use of a communication module of the object. The camera can be designed to acquire moving images or static images. In the case of a thermal detection, the camera can be a thermal imaging camera. The use of a thermal imaging camera may have advantages over a camera based on optical recognition in particular in poor or dark light conditions. In the case of design as an optical camera, the recognition can be detected, for example, from a brightness contrast of the moving object in comparison to the surroundings, or by the detection of movement sequences in the recognition range of the camera.

According to a further embodiment of a system according to the disclosure, it can be provided that the vehicle light is an LED matrix light. Using such an LED matrix light, the light cone generated thereby can be adapted flexibly in its spread, intensity, and alignment. An LED matrix light is composed of a plurality of individual LED radiation sources, which can be deliberately switched on and off via a suitable control unit. The light cone generated thereby can thus be set flexibly. The individual LEDs can also be dimmed. An LED matrix light is accordingly outstandingly suitable for providing a sidewalk light without dazzling surrounding buildings, vehicles, etc. at the same time. The vehicle light can be any light sources arranged on a vehicle, for example light sources which are used in regular operation of the vehicle to generate high beams, low beams, sidelights, parking lights, as fog headlights, taillights, brake lights, etc. Furthermore, the vehicle light does not necessarily have to be a matrix light, rather the vehicle light can be one or more LED light sources. Halogen, xenon, or laser light sources can also provide the vehicle light.

According to a further embodiment of a system according to the disclosure, it can be provided that as a result of the detection of the object approaching a respective vehicle, an item of route information, for example a direction sign or a warning sign is projectable on the path by means of the vehicle light. An object taking the route, for example a pedestrian, can have a direction indicator indicated on the path using a direction sign, whereby the orientation is facilitated in darkness. Furthermore, the route information can relate to an item of route information of a route of another object, so that a route of another object can be indicated on the path to an object. This can increase the feeling of safety or the traffic safety at times of poor visibility conditions, for example darkness.

According to a further embodiment of a system according to the disclosure, it can be provided that each vehicle has a sensor unit which is designed to sense light emitted by an adjacent vehicle and as a result to activate the vehicle light, wherein as a result of the activation, for example, an illumination of the path is executable and/or a direction sign or a warning sign is projectable on the path. Multiple such sensors can readily also be arranged on a vehicle, for example, in order to sense light from different directions. As already mentioned, multiple vehicles parked along a route can contribute to an illumination of the path along the route, i.e., can emit light, upon arrival of the object. Therefore, the light emitted by a vehicle can be detected by another vehicle, so that, for example, the illumination of the path can be recognized by adjacent vehicles or vehicles located (parked) in the vicinity and a separate vehicle light can be activated and switched on. Furthermore, other light sources can be detected using the mentioned sensors, for example a light source of another road user. As a result of this, a warning sign, for example a notification of a road user approaching the object, or a hazard sign, can be projected on the path. The feeling of safety and also the factual traffic safety of road users can thus be improved.

According to a further embodiment of a system according to the disclosure, it can be provided that the central system unit is designed, as a result of the route ascertainment, to transmit a request signal to a number of vehicles not parked along the route, according to which in the course of an autonomous vehicle movement, re-parking of the number of vehicles not parked along the route onto a parking position located along the route is to take place. In some cases, no route may be ascertainable, on which sufficient vehicles networked with the central system unit are parked and can thus provide a coherent illuminated path along the route. In this case, the central system unit can cause a (networked) vehicle parked in the surroundings of the route—in case of a free parking area along the route—to modify its parking position and change to a parking space located on the route. In particular in the case of autonomously controlled vehicles, this can be implemented easily, since no human action is necessary to re-park the vehicle.

The present system can be linked to a payment system for a customer. If a customer, for example a pedestrian providing the moving object, desires the ascertainment of a route from a starting location to a destination location, he can thus—for example via an app of a mobile terminal or a computer—place a route query. The route query can already be linked with a payment process. Furthermore, the payment process can also be provided for the provision of the route, i.e., the central system unit initiates processes to ensure the route provision (sending out a readiness request to the vehicles, initiating re-parking of vehicles, etc.).

As already mentioned, the underlying object of the disclosure is moreover achieved by a method for providing an illuminated path for an object moving on the path along a route, in particular a pedestrian or bicyclist. The method is executed using a system according to the disclosure, wherein the system comprises a central system unit and a number of vehicles mobile-networked with the central system unit and parked in a region. According to the proposed method a route query is placed to the central system unit by the object, wherein the route query relates to a route from a starting location located in the region up to a destination location located in the region;

geo-position data of the vehicles parked in the region are transmitted to the central system unit, for example continuously or as a result of the route query, the route is ascertained on the basis of the route query and the geo-position data of the vehicles parked in the region, namely under the criterion that a maximum number of parked vehicles networked with the central system unit are present along the route;

the object is detected upon approach to a vehicle parked along the route;

as a result of the detection, a vehicle light, in particular a vehicle light facing toward a path, is activated and the path is illuminated and/or an item of route information, for example a direction sign or a warning sign, is projected on the path.

In the scope of the method proposed by the disclosure, it can be provided that as a result of the route ascertainment by the central system unit, a request signal is transmitted to a number of vehicles not parked along the route, according to which in the course of an autonomous vehicle movement, re-parking of the number of vehicles not parked along the route to a parking position located along the route takes place. For this purpose, the distribution and number of parked vehicles present in the region is ascertained and taken into consideration. The route is ascertained under the criterion of optimal path illumination along the entire route, i.e., re-parking is only required if sufficient vehicles for providing a sufficient path illumination are not distributed along the route.

BRIEF DESCRIPTION OF THE DRAWINGS

Further features and advantages of the disclosure result from the following description of the functionality of a system or method according to the disclosure. This description represents an exemplary embodiment of the present disclosure which is not to be understood as restrictive and which is explained in greater detail in the following with reference to the drawings. In the schematic figures of the drawings.

DETAILED DESCRIPTION

An example of a system according to the disclosure for providing an illuminated path for an object 2 moving on the path along a route 1 is shown in FIGS. 1 to 4. The object 2 is a pedestrian. A path can be understood as a pedestrian path, or another type of special path. The identification of the route 1 on the basis of the dashed line (FIG. 2) is not to be understood to mean that the vehicles 4 are parked on the path, but rather on parking areas or parking spaces adjacent to the path (otherwise the path would be blocked by the vehicles 4).

Figure 1:
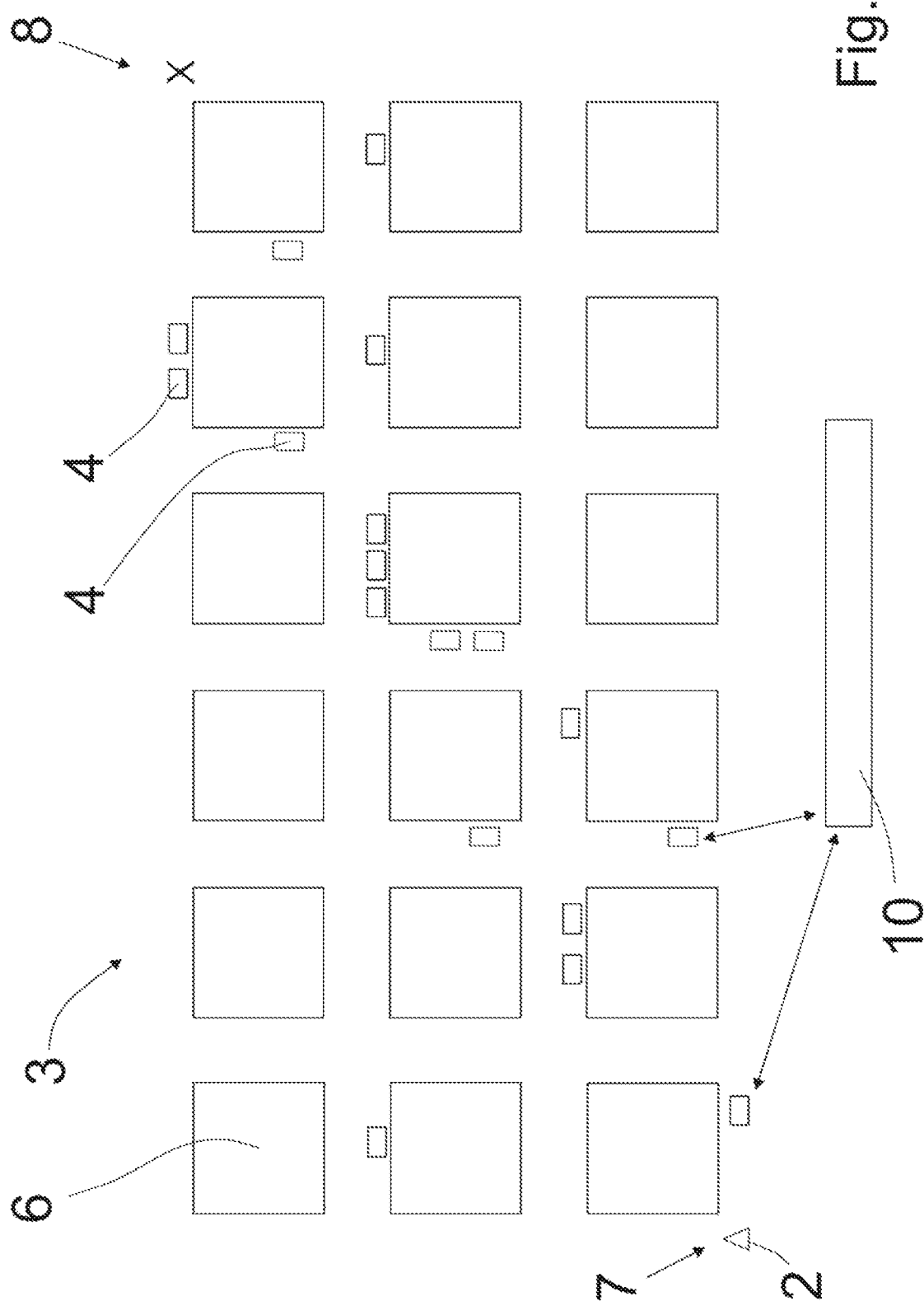
FIG. 1 shows an illustration of vehicles parked in a region, in which the system or method according to the disclosure for ascertaining a route for a moving object is used.

As can be seen in FIG. 1, in a region 3, for example an urban district having a large number of city blocks 6, a large number of vehicles 4 are located. The vehicles 4 are networked with a central system unit 10 and possibly also with one another. The networking takes place wirelessly (illustrated by double arrows). The vehicles 4 are parked on different parking spaces intended for vehicles 4, and are thus located in a parked state, thus not in motion. In the present example, the parked vehicles 4 are distributed around city blocks 6.

At least one detection unit (not shown) is integrated in each of the respective vehicles 4 and/or attached to the vehicle 4. The detection unit is designed to detect activities outside the vehicle 4, in particular to detect or recognize an approaching object 2. It can be provided that multiple (differently aligned) detection units are arranged on the respective vehicles 4 or integrated therein. Furthermore, the individual vehicles 4 have a communication unit, using which geo-position data of the respective parked vehicle 4 are transmitted to the central system unit 10.

Figure 2:
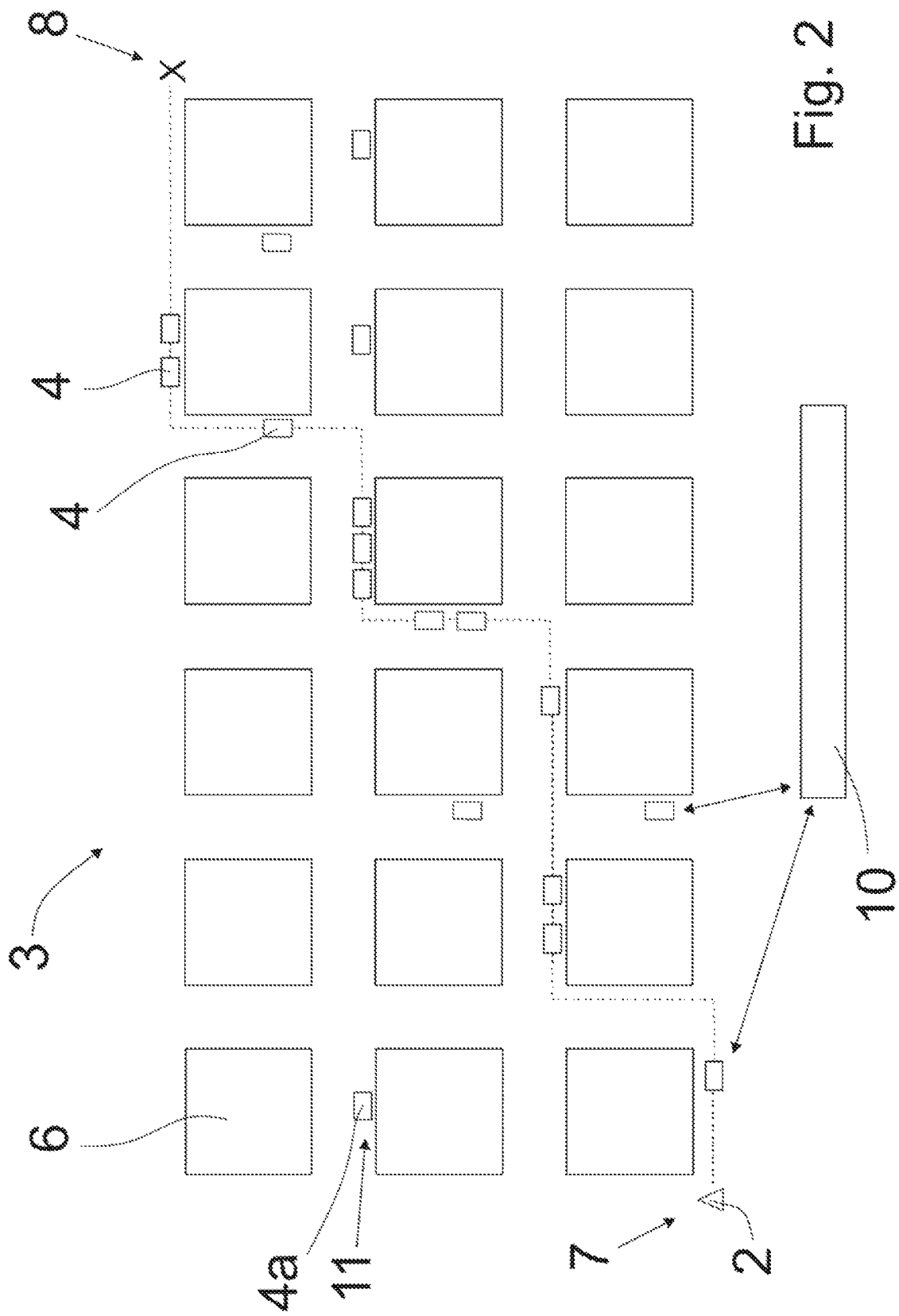
FIG. 2 shows an illustration of an ascertained route from a starting location to a desired destination location.

Based on the geo-positions known to the central system unit 10 of the vehicles 4 parked in the region 3, the central system unit 10 ascertains as a result of a route query (for example from the object 2 or pedestrian), a route 1 for the object 2 from a starting location 7 located in the region 3 up to a destination location 8 located in the region 3. The route is ascertained under the criterion that a maximum number of parked vehicles 4 networked with the central system unit 10 are provided along the route 1, so that the best possible path illumination is ensured on the route 1. The path illumination is provided in that an object 2 moving along the route is detected by the parked vehicles 4, in particular by a detection unit, and as a result of the detection a vehicle light, in particular a vehicle light facing toward a path is activated. This illuminates the path in an illumination region 5. An exemplary route 1 through the region 3 is shown in FIG. 2, wherein a large number of vehicles 4 are parked along the route 1. If the object 2 moves from the starting location 7 to the destination location 8, a path illumination is thus ensured by the vehicles 4.

Figure 3:
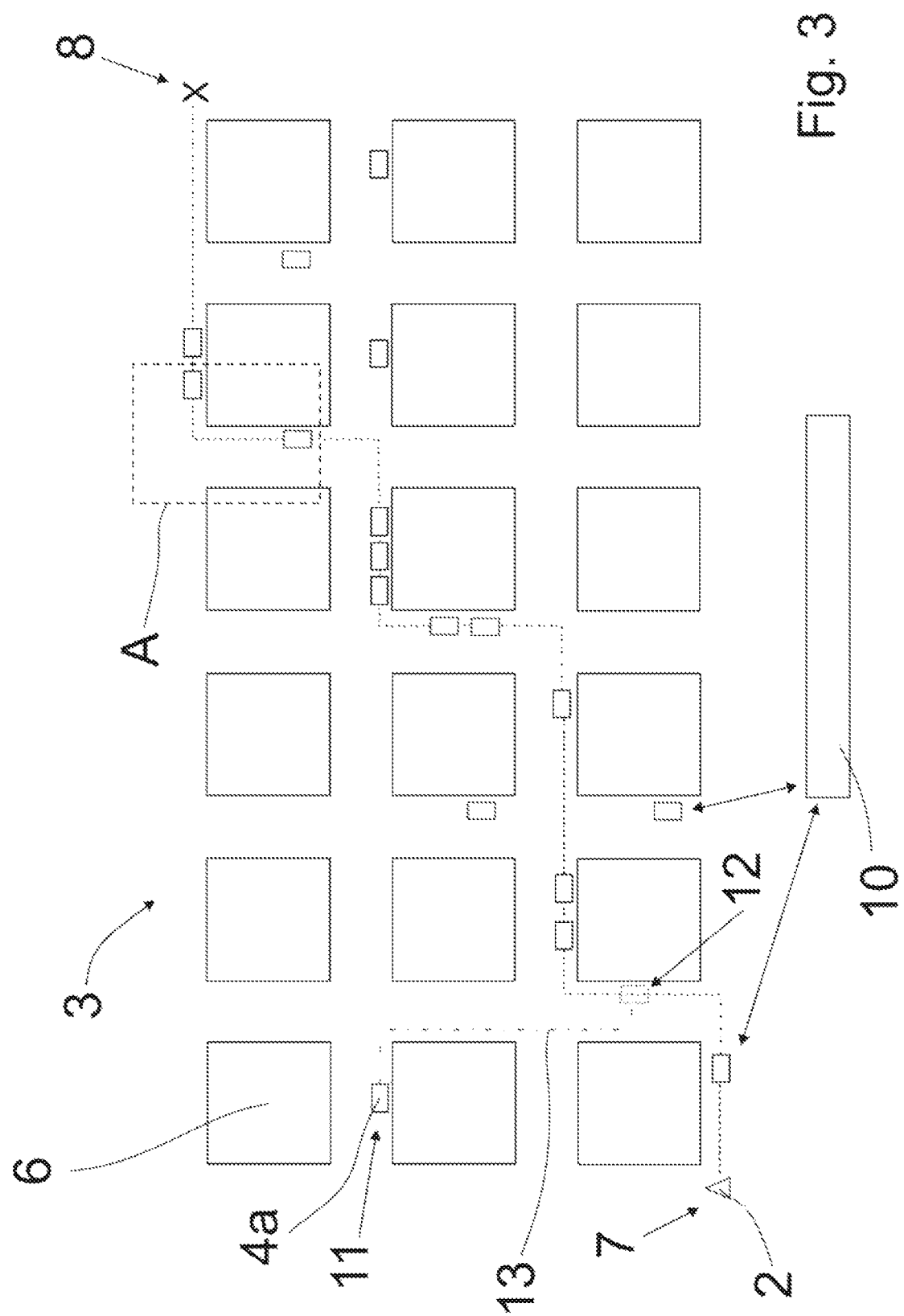
FIG. 3 shows an illustration of a vehicle movement for optimizing the illumination along the route.

FIG. 3 illustrates that in the case of an inadequate number of vehicles 4 parked along the route and providing a path illumination, a vehicle 4a parked away from the route 1 is ordered from a parking position 11 away from the route 1 onto a parking position 12 on the route 1, i.e., re-parking of the vehicle 4a is brought about. The vehicle 4a drives in this case —preferably autonomously—along a path section 13 to its new parking position 12 located on the route 1. This process is controlled via the central system unit 10. The vehicle 4a then provides—like the further vehicles 4 as well—a path illumination for the object 2. As already mentioned, such a procedure takes place as a result of the route ascertainment by the central system unit 10. In this case, a request signal is transmitted to a number of vehicles 4a not parked along the route 1, according to which, in the course of an autonomous vehicle movement, re-parking of the number of vehicles 4a not parked along the route 1 to a parking position 12 located along the route 1 takes place. For this purpose, the distribution and number of parked vehicles 4, 4a present in the region 3 is ascertained and taken into consideration. The route ascertainment is carried out under the criterion of optimum path illumination along the entire route 1, i.e., re-parking is only required if sufficient vehicles 4 are not distributed to provide sufficient path illumination along the route 1.

Figure 4:
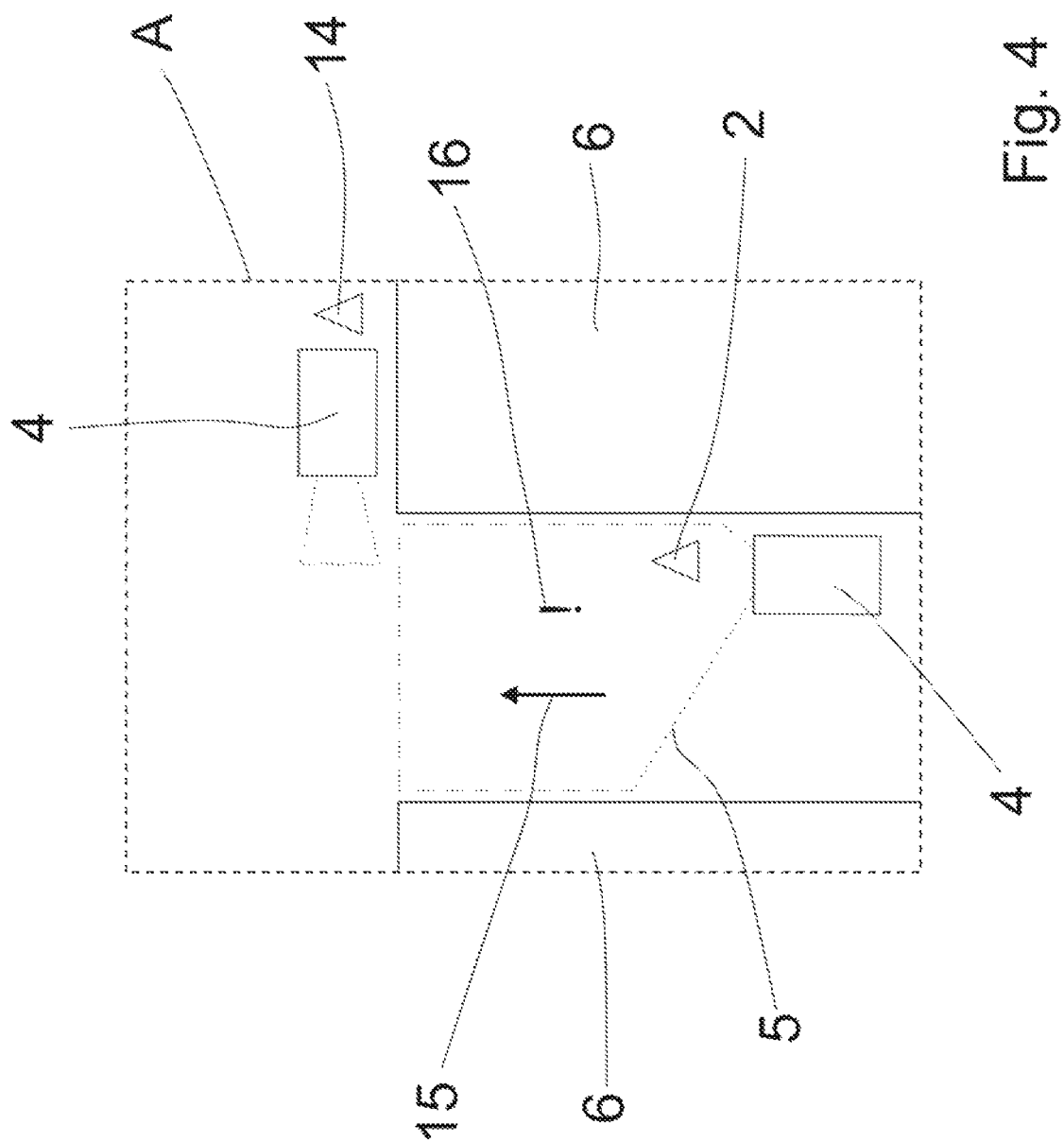
FIG. 4 shows an illustration of a detail from FIG. 3.

FIG. 4 illustrates a detail A of FIG. 3. An illumination area 5 of a vehicle 4 is shown therein, wherein the illumination area illuminates the path along the route 1 for the object 2 (the pedestrian). It is furthermore shown that as a result of the detection of the object 2 approaching the vehicle 4, an item of route information, for example a direction sign 15, is projectable on the path by means of the vehicle light. The course of the route 1 can thus be illustrated to the object 2.

It is also possible that a further road user 14 is detected by a vehicle 4. This information can be relayed among the networked vehicles 4, or it is transmitted via the central system unit 10 to the vehicles located in the vicinity. A warning signal 16 can then be displayed by a vehicle 4, for example to notify the moving object 2 (the pedestrian) of a further road user 14.

LIST OF REFERENCE SIGNS 1 route
2 object
3 region
4 vehicle
5 illumination area
6 city block
7 starting location
8 destination location
10 system unit
11 parking position
12 parking position
13 path section
14 road user
15 direction sign
16 warning sign
A detail

The invention claimed is:

1. A system for providing an illuminated path for an object (2) moving on a path along a route (1), the system comprising
a central system unit (10) comprising a processing unit; and
a number of vehicles (4) in communication with the central system unit (10) and parked in a region (3), wherein each of the vehicles (4) includes:
a detection unit, which is designed to detect the object (2) approaching the parked vehicle (4) on the path and as a result of the detection to activate a vehicle light facing toward the path and illuminate the path, and
a communication unit, which is designed to transmit geo-position data of the parked vehicle (4) to the central system unit (10),
wherein the central system unit (10) is designed, as a result of a route query, to ascertain the route (1) for the object (2) from a starting location (7) located in the region (3) to a destination location (8) located in the region (3) based on a maximum number of parked vehicles (4) networked with the central system unit (10) are present along the route (1) so that a best possible path illumination is ensured on the route (1).

2. The system of claim 1, wherein each of the vehicles (4) includes a GPS unit for determining geo-position data of the vehicle (4), wherein each vehicle (4) in a parked state transmits geo-position data on a parking position to the central system unit (10).

3. The system of claim 1, wherein the detection unit of each vehicle (4) is designed to detect the approaching object (2) based on a wireless communication with a communication module of the object (2).

4. The system of claim 3, wherein the communication module is integrated into a mobile terminal.

5. The system of claim 1, wherein the object (2) continuously transmits its geo-position data to the vehicles (4) parked along the route (1) using a mobile terminal by transmitting the geo-position data to the central system unit (10) and relaying the geo-position data from the central system unit (10) to the vehicles (4) parked along the route (1).

6. The system of claim 1, wherein the detection unit comprises a camera, which is designed to recognize the approaching object (2) optically or thermally.

7. The system of claim 1, wherein the vehicle light is an LED matrix light.

8. The system of claim 1, wherein as a result of the detection of the object (2) approaching a respective vehicle (4), an item of route information comprising a direction sign (15) or a warning sign (16) is projectable on the path by the vehicle light.

9. The system of claim 1, wherein each vehicle (4) includes a sensor unit, which is designed to sense light emitted by an adjacent vehicle (4) and as a result of this to activate a vehicle light, wherein as a result of the activation, an illumination of the path is executable and/or a direction sign (15) or a warning sign (16) is projectable on the path.

10. The system of claim 1, wherein the central system unit (10) is designed, as a result of the route ascertainment, to transmit a request signal to a number of vehicles (4a) not parked along the route (1), according to which in the course of an autonomous vehicle movement, re-parking of the number of vehicles (4a) not parked along the route to a parking position (12) located along the route is to take place.

11. The system of claim 1, wherein the object comprises a pedestrian or bicyclist.

12. A method for providing an illuminated path for an object (2) moving on a path along a route (1), the method comprising
providing a central system unit (10) comprising a processing unit;
communicating with a number of vehicles (4) in communication with the central system unit (10) and parked in a region (3), wherein each of the vehicles (4) includes
a detection unit, which is designed to detect the object (2) approaching the parked vehicle (4) on the path and as a result of the detection to activate a vehicle light facing toward the path and illuminate the path,
a communication unit, which is designed to transmit geo-position data of the parked vehicle (4) to the central system unit (10), and
determining by the central system unit (10) and as a result of a route query, the route (1) for the object (2) from a starting location (7) located in the region (3) to a destination location (8) located in the region (3) based on a maximum number of parked vehicles (4) networked with the central system unit (10) are present along the route (1) so that a best possible path illumination is ensured on the route (1).

13. The method of claim 12, wherein each of the vehicles (4) includes a GPS unit for determining geo-position data of the vehicle (4), wherein each vehicle (4) in a parked state transmits geo-position data on a parking position to the central system unit (10).

14. The method of claim 12, wherein the detection unit of each vehicle (4) is designed to detect the approaching object (2) based on a wireless communication with a communication module of the object (2).

15. The method of claim 12, wherein the object (2) continuously transmits its geo-position data to the vehicles (4) parked along the route (1) using a mobile terminal by transmitting the geo-position data to the central system unit (10) and relaying the geo-position data from the central system unit (10) to the vehicles (4) parked along the route (1).

16. The method of claim 12, wherein the detection unit comprises a camera, which is designed to recognize the approaching object (2) optically or thermally.

17. The method of claim 12, wherein as a result of the detection of the object (2) approaching a respective vehicle (4), an item of route information comprising a direction sign (15) or a warning sign (16) is projectable on the path by the vehicle light.

18. The method of claim 12, wherein each vehicle (4) includes a sensor unit, which is designed to sense light emitted by an adjacent vehicle (4) and as a result of this to activate a vehicle light, wherein as a result of the activation, an illumination of the path is executable and/or a direction sign (15) or a warning sign (16) is projectable on the path.

19. The method of claim 12, wherein the central system unit (10) is designed, as a result of the route ascertainment, to transmit a request signal to a number of vehicles (4*a*) not parked along the route (1), according to which in the course of an autonomous vehicle movement, re-parking of the number of vehicles (4*a*) not parked along the route to a parking position (12) located along the route is to take place.

20. The method of claim 12, wherein the object comprises a pedestrian or bicyclist.

\* \* \* \* \*